United States Patent [19]

Burn

[11] Patent Number: 5,296,426
[45] Date of Patent: Mar. 22, 1994

[54] LOW-FIRE X7R COMPOSITIONS

[75] Inventor: Ian Burn, Hockessin, Del.

[73] Assignee: E. I. Du Pont de Nemours and Company, Wilmington, Del.

[21] Appl. No.: 915,873

[22] Filed: Jul. 20, 1992

Related U.S. Application Data

[63] Continuation of Ser. No. 538,527, Jun. 15, 1990, abandoned.

[51] Int. Cl.$^5$ .................. C04B 35/46; H01G 4/10; H01G 4/12
[52] U.S. Cl. .................. 501/139; 501/137; 501/138; 361/321.5
[58] Field of Search .................. 501/138, 139, 137; 361/321; 428/472

[56] References Cited

U.S. PATENT DOCUMENTS

| | | | |
|---|---|---|---|
| 3,473,958 | 10/1969 | Wakii | 501/138 X |
| 4,014,707 | 3/1977 | Tanaka et al. | 501/139 |
| 4,447,855 | 5/1984 | Lagrange et al. | 501/136 |
| 4,459,364 | 7/1984 | McSweeney et al. | 501/138 |
| 4,640,905 | 2/1987 | Burn | 501/137 |
| 4,766,027 | 8/1988 | Burn | 264/63 X |
| 4,803,591 | 2/1989 | Miyashita et al. | 501/138 |
| 4,845,062 | 7/1989 | Burn | 501/138 |
| 4,855,266 | 8/1989 | Burn | 501/139 X |

*Primary Examiner*—Mark L. Bell
*Assistant Examiner*—Deborah Jones

[57] ABSTRACT

A composition for forming a densified ceramic dielectric body, the composition consisting essentially of (a) about 96.0–98.0 wt. % barium titanate having an average particle size of 0.5–1.25 microns; (b) 0.3–1.2 wt. % niobium oxide or precursor thereof; (c) 0.4–1.2 wt. % zinc oxide or precursor thereof; (d) 0.1–1.2 wt. % neodymium oxide or precursor thereof; (e) 0.15–0.75 wt. % boron oxide or precursor thereof; and (f) 0–0.1 wt. % manganese oxide or precursor thereof. This composition can be used to form the dielectric layers in multilayer electrical devices such as circuits and capacitors.

12 Claims, No Drawings

LOW-FIRE X7R COMPOSITIONS

This is a continuation of application Ser. No. 538,527 filed Jun. 15, 1990, now abandoned.

FIELD OF THE INVENTION

The invention is related to improved low-firing dielectric compositions with high dielectric constant and good temperature stability, for use in multilayer devices such as capacitors.

BACKGROUND OF THE INVENTION

There is much prior art, such as Electrocomponent Science and Tech. 1976, Vol. 2, pp. 241-247 and EP 205 137A, which describes the addition of donor dopants such as niobium oxide and/or rare-earth oxides, in combination with acceptor dopants such as cobalt oxide, zinc oxide and/or manganese oxide, to improve the temperature stability of barium titanate. Also, there is much prior art, such as U.S. Pat. No. 4,540,676, U.S. Pat. No. 4,640,905 and U.S. Pat. No. 4,845,062, which describes the use of fluxes, including zinc borate fluxes, to reduce the firing temperature of titanate dielectrics below 1150° C. In addition, it is well known that lower sintering temperatures and/or higher dielectric constants can be obtained by using a high purity barium titanate with particle size close to 1 micron, several sources of which are now available commercially. See, for example, U.S. Pat. No. 4,640,905, DE 3915339-A1 and WO 88/08830. It is also well known that modifiers added to the barium titanate should be uniformly distributed for optimum properties and that the use of coarse particles can lead to segregation of the modifier with the potential for poor reliability when the dielectric is used in MLC's with layer thickness less than 25 microns. See WO 88/08830. However, in spite of this information, it has been difficult for those skilled in the art to achieve dielectric constants >2500 with stable (i.e., X7R) temperature characteristics for dielectrics sintered below 1150° C.

PRIOR ART

U.S. Pat. No. 4,803,591 (Miyashita et al.)

Dielectric compositions are claimed which consist essentially of 94.7-99.39 mol % barium titanate, 0.5-3.0 mol % of niobium oxide, 0.1-1.0 mol % zinc oxide, and 0.01-0.30 mol % of manganese dioxide. Dielectric constants over 2500 are disclosed with X7R characteristics but firing temperatures above about 1250° C. are needed.

U.S. Pat. No. 4,845,062 (Burn)

Low-firing compositions are disclosed in which zinc-barium-aluminoborate fluxes are used to sinter mixtures of magnesium titanate and calcium titanate particles at temperatures below 1150° C.

U.S. Pat. No. 4,540,676 (Chu et al.)

Low-firing dielectric compositions with good temperature stability are described. The compositions comprise about 93.5 to 96.5 wt. % of a base ceramic preparation and 3.5 to 6.5% of a ceramic flux. The base ceramic composition consists essentially of 98 to 99 wt. % barium titanate, 0.97 to 1.54% niobium oxide, and 0.19 to 0.32 wt. % of cobalt oxide. The ceramic flux consists essentially of 16 to 60 wt. % bismuth titanate, 8 to 52% lead titanate, 18 to 35% zinc oxide, and 5 to 11% boron oxide. Manganese dioxide may also be present to a level of 0 to 0.114% of the total composition.

U.S. Pat. No. 4,447,855 (Lagrange et al.)

Low-firing dielectric compositions based on barium titanate are described that have X7R characteristics and dielectric constant up to 2350. The compositions comprise a mixture containing 80 to 94 wt. % barium titanate, 1 to 3% neodymium oxide, 0 to 4% bismuth oxide, 2 to 5% bismuth titanate, and 2 to 8% glass frit. The glass frit is a bismuth-lead borate. It is preferred that the composition also contains 0.5% zinc oxide or manganese oxide, or mixtures thereof.

U.S. Pat. No. 4,459,364 (McSweeney et al.)

Low-firing X7R compositions are claimed which consist essentially of a reacted mixture of 83 to 90 wt. % barium titanate, 8 to 13% bismuth oxide, 0 to 4% niobium oxide, 0 to 1.8% tin oxide or titanium oxide, and 0.04 to 0.18% manganese oxide. The compositions preferably do not contain zinc oxide. The dielectric constant is as high as 1710.

SUMMARY OF THE INVENTION

It is an object of the invention to provide a dielectric composition free of lead, cadmium, bismuth, and alkali ions which can be fired into a dense ceramic body at a temperature below 1150° C. and have a dielectric constant (K) of at least 2500.

It is another object of the invention to provide a ceramic composition which can meet or exceed the Electrical Industries Association (EIA) specification of X7R:

(1) a temperature coefficient of capacitance (TCC) of not more than ±15%, with respect to the value at 25° C., over the temperature range −55° to 125° C.;

(2) a dissipation factor (DF) of not more than 2.5% at 25° C. when measured at 1 KHz with 1.0 V (rms) applied;

(3) an insulation resistance (IR) of at least 1000 ohm-.farads measured at 25° C., and at least 100 ohm-.farads when measured at 125° C.

In its primary aspect, the invention is directed to a composition for forming a densified ceramic dielectric body consisting essentially of:

(1) about 96.0–98.0 wt. % barium titanate with an average particle size of 0.5 to 1.25 microns,
(2) 0.3–1.2 wt. % of niobium oxide,
(3) 0.4–1.2 wt. % of zinc oxide,
(4) 0.1–1.2 wt. % of neodymium oxide,
(5) 0.15–0.75 wt. % of boron oxide,
(6) 0–0.1 wt. % manganese oxide.

In another aspect, the invention is directed to dispersions of the above-described composition in an organic medium which can be cast as a green tape.

In a further aspect, the invention is directed to dielectric layers made by firing the above-described green tape to volatilize the organic medium therefrom and to densify the inorganic solids by sintering.

In a still further aspect, the invention is directed to multilayer devices comprising the above-described dielectric layers interspersed with patterned electrically conductive layers.

DETAILED DESCRIPTION

The amount of barium titanate ranges from about 96.0 to 98.0 wt. % and the average particle size ($D_{50}$) should be 0.5 to 1.25 microns. Preferably, the barium titanate contains no more than about 0.3 wt. % of SrO and no more than about 0.1 wt. % of other impurities such as $SiO_2$ and $Fe_xO_y$.

A method for preparing the barium titanate is disclosed in copending application, U.S. Ser. No. 07/265,295, now U.S. Pat. No. 5,087,437, which is a continuation-in-part of U.S. Ser. No. 07/144,835 now abandoned and comprises the steps of:

(a) mixing an organometallic compound, or mixture of organometallic compounds, of the structure $TiL_n$, where L is a hydrolyzable group, or a combination of such groups, selected from alkoxy, aryloxy, aminoalkoxy, acetoxy, and acetoacetonyl with a solution of a compound, or a mixture of compounds, of the general structure $BaX_y$, where X is an anion, or a combination of anions, selected from hydroxide, chloride, nitrate and acetate in an alkaline, high turbulence energy environment;

(b) crystallizing the reaction product; and (c) isolating the crystals.

In a particularly preferred embodiment of this method, the barium titanate is prepared by:

(a) reacting tetrabutyl titanate as a first ingredient stream with a solution of barium hydroxide as a second ingredient stream at a temperature of 80°-85° C. in a high turbulence energy environment comprising pumping said ingredient streams simultaneously through a coaxial jet mixer to form a slurry and discharging said slurry into a drownout vessel containing an alkaline heel of water;

(b) crystallizing said slurry by heating under reflux with continuous agitation; and (c) isolating said crystals.

The additives to the barium titanate consist essentially of niobium oxide, zinc oxide, neodymium oxide, boron oxide and manganese oxide. A precursor of any of these additives may be added with or in lieu of the recited metal oxide. A precursor of a metal oxide is a compound which upon calcining or firing is converted to the metal oxide. These include carbonates, hydroxides and nitrates.

Niobium oxide is present in an amount ranging from 0.3 to 1.2 wt. % of the composition. If the amount of niobium oxide is less than 0.3 wt. %, the TCC of the densified dielectric layer falls outside the X7R specifications at −55° to 85° C. If, however, the amount of niobium oxide exceeds about 1.2 wt. %, sinterability of the composition is retarded, the TCC of the densified dielectric layer exceeds the X7R limit of +15% at 125° C., and K of the densified layer is less than 2500.

Zinc oxide is present in an amount ranging from 0.4 to 1.2 wt. % of the composition. Sinterability is retarded if the amount of zinc oxide is less than 0.4 wt. %, and the TCC exceeds the X7R limit of −15% at both −55° and 125° C. if the amount of zinc oxide is greater than about 1.2 wt. %.

The amount of neodymium oxide is in the range of 0.1 to 1.2 wt. %. Up to 20 mole % of the neodymium oxide can be replaced by oxides of rare-earth metals selected from Ce, Pr, Sm and up to 50 mol % of the neodymium oxide can be replaced by barium oxide, or combinations of alkaline-earth oxides. If the amount of neodymium oxide (which includes amounts replaced as just described) is less than 0.1 wt. %, the TCC is close to the −15% X7R limit at −55° C., and if it is more than 1.2%, the TCC exceeds the −15% X7R limit at 85°-125° C.

Boron oxide is present in an amount in the range of 0.15 to 0.75 wt. %. Up to 33.3 mole % of the boron oxide can be replaced by aluminum oxide. Sintering of the composition is retarded if the amount of boron oxide (which amount includes any aluminum oxide) is less than 0.15 wt. %. K is reduced below 2500 if the amount of boron oxide exceeds 0.75 wt. %.

A small amount of manganese oxide increases insulation resistance but can be omitted if some of the neodymium oxide is replaced by cerium oxide. Thus, manganese oxide may be added to the composition in amounts of 0 to 0.1 wt. %.

In the present invention, it was discovered that a combination of a small cation donor ($Nb^{5+}$) with a large cation donor ($Nd^{3+}$) improved the temperature stability of the barium titanate when a zinc borate flux was used. However, a suitable source of finely divided neodymium oxide or precursor (i.e., particles of less than about 1 micron) could not be found commercially, nor could one be prepared by milling coarse powder. Large particles (i.e., greater than about 1 micron) undesirably reduce the distribution of the neodymium oxide throughout the composition and can form lumps in thin layers. It was found that the particle size of the neodymium oxide could be reduced by preparing a zinc borate flux with the neodymium included in the flux. Thus, in a preferred embodiment of the invention, the niobium oxide is added as a fine powder with particle size ($D_{50}$) of 0.5-1.0 microns, and the zinc oxide, neodymium oxide, and boron oxide are added as a fine zinc-neodymium-aluminoborate flux powder with particle size ($D_{50}$) of 0.5-1.25 microns. A preferred flux composition has the following formula (in moles):

$$12\ ZnO.3\ Nd_2O_3.4\ B_2O_3.2\ Al_2O_3$$

This formula corresponds to 39.6 wt. % zinc oxide, 40.9 wt. % neodymium oxide, 11.3 wt. % boron oxide and 8.3 wt. % aluminum oxide.

Alternatively, the neodymium oxide can be applied to the surface of the barium titanate powder by coating with a solution containing neodymium ions. The other additives can also be added as a coating to the barium titanate powder, either sequentially or from a solution containing an appropriate mixture of ions. In an especially preferred embodiment of the invention, oxides of Nb, Zn, Nd, B and Mn, or precursors thereof, are coated onto the barium titanate.

A process for distributing the mixture of additives on the surface of the barium titanate powder particles is disclosed in copending application Ser. No. 07/506,965, now U.S. Pat. No. 5,082,811 and comprises the following steps:

(a) preparing a concentrated stable solution of metal (i.e. additive) chelates;

(b) adding the solution of metal chelates to a dry barium titanate powder at a controlled rate while vigorously stirring the mixture below the liquid limit of the powder; and (c) drying and calcining the powder to decompose metal chelates and remove volatile residues.

The solution of metal chelates is prepared by dissolving a mixture of metal compounds in a concentrated aqueous or aqueous/organic solution of chelating agents. Upon adjustment of the pH, the chelating agent is capable of forming soluble metal chelates with metal ions. Chelating agents increase the solubility of metal compounds in aqueous or aqueous/organic solvents. This enhanced solubility is necessary to obtain an adequate coat when applied to dry powders when applied below the liquid limit of the powder.

The metal chelate solution is added at a controlled rate to the dry barium titanate powder while vigorously stirring below the liquid limit of the powder to obtain a homogeneous distribution on the particles before the solvent evaporates. The liquid limit refers to the water content in weight percent, of a powder comprising ceramic particles at an arbitrarily defined boundary between the liquid and plastic states. The ASTM Standard D4318-84 describes in greater detail the standard test method for liquid limit in reference to soils, and is incorporated herein with reference to powders.

The powder is dried and calcined to decompose the metal chelates and to complete the formation of a homogeneous coating on the barium titanate powder.

Alternatively, the method may be modified so that the oxides of Nb, Na and Mn are coated first, and then a zinc borate coating is subsequently applied to the particles, for example by the method disclosed in co-pending application, U.S. Ser. No. 07/506,964, now U.S. Pat. No. 5,011,804 which comprises the steps of:

(a) mixing zinc borate flux component precursors with Nb, Nd, Mn metal coated barium titanate powder whereby the zinc borate flux component precursors form a uniform coating on each particle; and (b) drying and optionally calcining the coated particles.

One coating method for carrying out this flux coating operation involves blending below the liquid limit of the powder and comprises distributing the flux uniformly on the surface of the metal coated barium titanate powder particles by:

(a) adding a concentrated solution of at least one boron and one zinc flux component precursor to the metal coated barium titanate powder while maintaining the pH at a predetermined range to prevent the dissolution of ions from the surface of the barium titanate powder particles;

(b) vigorously stirring the mixture below the liquid limit of the barium titanate powder to uniformly coat the particles with the flux component precursors; and (c) drying and optionally calcining the uniformly coated particles.

A second coating method for carrying out the flux coating operation is surface hydrolysis which comprises distributing the flux uniformly on the surface of the metal coated barium titanate powder particles by:

(a) dispersing a hydroxylated metal coated barium titanate powder in a solution of at least one zinc and one boron flux component hydrolysable precursor in a water immiscible organic solvent;

(b) separating by filtration, centrifugation or decantation and washing the particles; and (c) drying and optionally calcining the uniformly coated particles.

A third coating method for carrying out the flux coating operation is surface nucleation which comprises distributing the flux uniformly on the surface of the metal coated barium titanate powder particles by:

(a) dispersing the metal coated barium titanate powder in water;

(b) adding at a controlled rate either simultaneously or sequentially an aqueous solution of at least one zinc and one boron flux component precursor to the aqueous dispersion while maintaining the pH of the dispersion in the range of from 6.5 to 7.5 and the temperature in the range from 50° to 70° C.;

(c) recovering the barium titanate powder particles; and (d) drying and optionally calcining the uniformly coated particles.

The barium titanate composition of the invention can be formulated into a dielectric green tape. One method for forming such tape comprises casting a dispersion of the dielectric barium titanate composition in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% wt. polymer binder for 95% wt. ceramic solids. However, it is further preferred to use no more than 20% wt. polymer binder in 80% wt. ceramic solids. Within these limits, it is desirable to use the least possible amount of binder vis-a-vis solids in order to reduce the amount of organics which must be removed by pyrolysis.

In the past, various polymeric materials have been employed as the binder for green tapes, e.g., (poly)vinyl butyral, (poly)vinyl acetate, (poly)vinyl alcohol, cellulosic polymers such as methyl cellulose, ethyl cellulose, hydroxyethyl cellulose, methylhydroxyethyl cellulose, atactic polypropylene, polyethylene, silicon polymers such as (poly)methyl siloxane, (poly)methylphenyl siloxane, polystyrene, butadiene/styrene copolymer, polystyrene, (poly)vinyl pyrrolidone, polyamides, high molecular weight polyethers, copolymers of ethylene oxide and propylene oxide, polyacrylamides, and various acrylic polymers such as sodium polyacrylate, (poly)lower alkyl acrylates, (poly)lower alkyl methacrylates and various copolymers and multipolymers of lower alkyl acrylates and methacrylates. Copolymers of ethyl methacrylate and methyl acrylate and terpolymers of ethyl acrylate, methyl methacrylate and methacrylic acid have been previously used as binders for slip casting materials.

More recently, Usala, in U.S. Pat. No. 4,613,648 has disclosed an organic binder which is a mixture of compatible multipolymers of 0-100% wt. $C_{1-8}$ alkyl methacrylate, 100-0% wt. $C_{1-8}$ alkyl acrylate and 0-5% wt. ethylenically unsaturated carboxylic acid or amine. Because the polymers permit the use of minimum amounts of binder and maximum amounts of dielectric solids, their use is preferred with the dielectric composition of this invention.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include acetone, xylene, methanol, ethanol, methyl ethyl ketone, 1,1,1-trichloroethane, tetrachloroethylene, amyl acetate, 2,2,4-triethyl pentandiol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glycerol, (poly)ethylene oxides, hydroxyethylated alkyl phenol, dialkyldithiophosphonate and (poly)isobutylene. Of course, butyl benzyl phthalate is most frequently used in acrylic polymer systems because it can be used effectively in relatively small concentrations.

Multilayer devices such as circuits and capacitors can be fabricated from green tapes and electrically conductive metallizations. For example, a metallization can be printed in the desired pattern upon a green tape. The printed tapes are stacked, laminated and cut to form the desired structures. The green assemblage is then fired to effect removal of the organic medium from the metallization material and of the organic binder from the dielectric material. The removal of these materials is accomplished by a combination of evaporation and thermal decomposition during the firing operation. In some instances, it may also be desirable to interpose a preliminary drying step prior to firing. The thickness of the unfired green tape is typically about 18-30 microns and upon firing the thickness becomes about 15-25 microns.

When firing the above-described assemblages with silver-palladium metallization, it is preferred to employ a first firing step in which the assemblage is heated slowly to 100°-550° C. which will be effective to remove all of the organic material without damage to the laminated assemblage. Typically the organic burnout period is 18-24 hours to assure complete removal of organics. When this has been completed, the assemblage is then heated more rapidly to the desired sintering temperature.

The desired sintering temperature is determined by the physical and chemical characteristics of the dielectric material. Ordinarily the sintering temperature will be chosen to obtain maximum densification of the dielectric material. For the dielectric compositions of this invention, the temperature will range from 1000° to 1150° C. However, it will be recognized by those skilled in the art of fabricating electrical devices that maximum densification is not always needed. Therefore, the term "sintering temperature" refers to the temperature (and implicitly the amount of time as well) to obtain the desired degree of densification of the dielectric material for the particular application. Sintering times also vary with the dielectric composition but ordinarily about 2.5 hours at the sintering temperature is preferred.

Upon completion of sintering, the rate of cooling to ambient temperature is carefully controlled in accordance with resistance of the compounds to thermal shock.

When fabricating assemblages with silver-palladium metallization, peak firing temperatures will typically be about 1100° C. The peak firing temperatures should be below the melting point of the silver-palladium alloy that is used for the metallization to avoid migration of the conductive metal into the dielectric layer. Assemblages with Cu metallization may be processed according to the method described fully in U.S. Pat. No. 4,891,246.

EXAMPLES

Example 1

This example describes a composition with no neodymium oxide present. Ceramic green tape was made by casting a slurry of an intimate mixture of 96.5 (wt) % barium titanate, 1.0% niobium oxide, 0.05% manganese carbonate, and 2.5% of a zinc-barium-aluminoborate frit, described as flux D in Table 1 of U.S. Pat. No. 4,845,062. The barium titanate (Fuji Titanium Co.) had an average particle size of 0.6 microns and was calcined for 5 hours at 1000° C. before being used. The slurry was prepared by milling the powder mix for 5 hours in 1,1,1-trichloroethane (38 g per 100 g of powder) with 2% AB1015 surfactant [E. I. du Pont de Nemours & Co., Inc., Wilmington, DE ("Du Pont Co.")] and then adding acrylic binder solution (20 g per 100 g of powder) and milling for a further 16 hours. The binder solution was a mixture of 91.7% acrylic resin in MEK (5200 binder, Du Pont Co.) and 8.3% butyl benzyl pthalate plasticizer. The ceramic composition was calculated to be 96.5 (wt) % barium titanate, 1.0% niobium oxide, 1.03% zinc oxide, 0.97% barium oxide, 0.30% boron oxide, 0.21% aluminum oxide, and 0.04% manganese oxide.

The ceramic tape was made into MLC's (EIA size 1209) with six internal electrodes and five active layers, each about 25 microns thick when fired. A 70% Ag-30% Pd paste (e.g., Du Pont 4765 or 4803) was used for printing the internal electrodes. The capacitors were fired at 1125° C. and were then terminated using silver paste (Du Pont 4506) which was fired on at 750° C.

Capacitance of the finished capacitors averaged 0.023 microfarads and DF was 1.7%. Insulation resistance was 8000-10,000 ohm.farads at 25° C., and 500-600 ohm.farads at 125° C. TCC was −12% at −55° C. and −1.0% at 125° C. Although the TCC was within the allowable range of ±15%, it was close to the limit at −55° C. Dielectric constant was calculated to be 2975, with a possible error of about 10%.

Example 2

A flux containing neodymium oxide instead of barium oxide was prepared by blending 136.73 g of neodymium oxide (Rhone-Poulenc), 132.26 g of zinc oxide (Baker), 67.0 g of boric acid (Fisher), and 27.62 g of fumed alumina (Degussa) with 200 g of isopropanol in a ball mill for 5 hours. The dry mix was calcined at 600° C. for 5 hours, and then milled 16 hours to a particle size ($D_{50}$) of 0.8 microns. Capacitors were prepared as in Example 1 using a mixture of 97.0% of the barium titanate of Example 1, 0.6% niobium oxide, 0.05% manganese carbonate, and 2.5 g of the neodymium-containing flux. The calculated composition was 97 (wt) % barium titanate, 0.6% niobium oxide, 0.99 zinc oxide, 1.02% neodymium oxide, 0.28% boron oxide, 0.21% aluminum oxide, and 0.04% manganese oxide.

The capacitors were fired as in Example 1 and had an average capacitance of 0.031 microfarads with DF of 1.8%. Insulation resistance was 12,000 to 24,000 ohm.farads at 25° C. and 400 ohm.farads at 125° C. TCC was −0.7% at −55° C. and −8.4% at 125° C. However, TCC was −14.1% at 105° C., close to the X7R limit. The calculated dielectric constant was 3400.

Example 3

In this example, 10 mol % of the flux used in Example 2 was replaced with a similar flux containing cerium oxide instead of neodymium oxide, and no manganese was added. The calculated composition was 96.9 (wt) % barium titanate, 0.6% niobium oxide, 0.92 neodymium oxide, 0.99% zinc oxide, 0.28% boron oxide, 0.21% aluminum oxide, and 0.10% cerium oxide. Capacitors were made as in Examples 1 and 2.

Average capacitance was 0.031 microfarads with DF of 1.8%. Insulation resistance was 5800 ohm.farads at 25° C., and 700 ohm.farads at 125° C. TCC was −1.2% at −55° C. and −8.6% at 125° C. but was −14.4% at 105° C. The calculated dielectric constant was 3450.

Example 4

In this example a zinc-neodymium-aluminoborate flux was used with higher boron oxide level and manganese was included in the flux. Also the barium titanate was calcined at 1050° C. (surface area 1.05 m²/g) instead of 1000° C. MLC's were made by the process described in the previous examples, except that the size of the capacitors was EIA 1206. The calculated composition of the dielectric was 96.8 (wt) % barium titanate, 0.7% niobium oxide, 0.94 neodymium oxide, 0.90% zinc oxide, 0.46% boron oxide, 0.19% aluminum oxide, and 0.02% manganese oxide.

Average capacitance was 0.020 microfarads with DF of 1.1%. Insulation resistance was 9000 ohm.farads at 25° C. and 400 ohm.farads at 125° C. TCC was 2.5% at −55° C. and 9.4% at 125° C., and was less than 10% over the entire temperature range. Calculated dielectric constant was 2900.

Example 5

In this example, MLC's were made in 1206 size using the composition of Example 2, except that high purity barium titanate made by the preferred embodiment of the process previously disclosed was used. This barium titanate had been calcined at 1050° C. for 5 hours before use. Surface area was 1.64 m²/g.

Average capacitance was 0.026 microfarads with DF of 1.4%. Insulation resistance was 11000 ohm.farads at 25° C. and 400 ohm.farads at 125° C. TCC was −4.3% at −55° C. and 2.5% at 125° C., and was less than 10% over the entire temperature range. Calculated dielectric constant was 3150.

Example 6

High purity barium titanate of the type used in Example 5 was calcined at 1070° C., to give a surface area of 1.7 m²/gm. The calcined barium titanate was coated with niobium oxide, neodymium oxide, and manganese oxide by the previously described method. Then, the metal coated barium titanate was coated with zinc oxide and boron oxide in accordance with the previously described flux coating methods. The nominal and analyzed amounts were as follows:

| Additive | Nominal (wt %) | Analytical (wt %) |
| --- | --- | --- |
| $Nb_2O_5$ | 0.52 | 0.48 |
| ZnO | 0.60 | 0.59 |
| $Nd_2O_3$ | 0.743 | 0.70 |
| $B_2O_3$ | 0.288 | 0.28 |
| MnO | 0.025 | 0.026 |

Capacitors were made by a similar procedure to that described in Example 4 and were fired at 1140° C. for 2.5 hours. Average capacitance was 0.029 microfarads with DF of 1.75%. Insulation resistance was 4000 ΩF at 25° C. and 340 ΩF at 125° C. Temperature coefficient of capacitance was −9.6% at −55° C. and −0.9% at 125° C., and was less than 10% over the entire temperature range. The calculated dielectric constant was 3167.

I claim:

1. A composition for forming a densified ceramic dielectric body at a temperature below 1150° which dielectric body has a dielectric constant of at least 2500, a temperature coefficient of capacitance that remains within +/−15% of the value at 25° C. over the range of −55° C. to 125° C., a dissipation factor of not more than 2.5% at 25° C. and 1 kHz with 1.0 V applied, and an insulation resistance of at least 1000 ohm.farads at 25° C. and at least 100 ohm.farads at 125° C., the composition consisting essentially of:
   (a) about 96.0–98.0 wt. % barium titanate having an average particle size of 0.5–1.25 microns;
   (b) 0.3–1.2 wt. % niobium oxide or precursor thereof;
   (c) 0.4–1.2 wt. % zinc oxide or precursor thereof;
   (d) 0.1–1.2 wt. % neodymium oxide or precursor thereof;
   (e) 0.15–0.75 wt. % boron oxide or precursor thereof; and
   (f) 0–0.1 wt. % manganese oxide or precursor thereof.

2. The composition of claim 1 consisting essentially of finely divided particles of:
   (a) about 96.0–98.0 wt. % barium titanate having an average particle size of 0.5–1.25 microns;
   (b) 0.3–1.2 wt. % niobium oxide having an average particle size of 0.5–1.0 microns;
   (c) 0.65–3.15 wt. % zinc-neodymium-borate flux having an average particle size of 0.5–1.25 microns; and
   (d) 0–0.1 wt. % manganese oxide.

3. The composition of claim 1 wherein the oxides of niobium, zinc, neodymium, boron and manganese, or precursors thereof, are coated on the barium titanate particles.

4. The composition of claim 1 wherein up to 20 mole % of the neodymium oxide is replaced by an oxide of a rare earth metal selected from the group consisting of Ce, Pr, Sm and mixtures thereof.

5. The composition of claim 1 wherein up to 50 mole % of the neodymium oxide is replaced by barium oxide, an alkaline-earth oxide or mixture of alkaline-earth oxide.

6. The composition of claim 1 wherein up to 33 mole % of the boron oxide is replaced by alumina.

7. The composition of claim 6 consisting essentially of finely divided particles of:
   (a) about 96.0–98.0 wt. % barium titanate having an average particle size of 0.5–1.25 microns;
   (b) 0.3–1.2 wt. % niobium oxide having an average particle size of 0.5–1.0 microns;

(c) 0.65–3.15 wt. % zinc-neodymium-aluminoborate flux having an average particle size of 0.5–1.25 microns; and (d) 0–0.1 wt. % manganese oxide.

8. The composition of claim 1 further comprising an organic medium in which components (a)–(e) are dispersed, the organic medium comprising a solution of volatile organic solvent and organic polymeric binder.

9. A dielectric sheet comprising a cast layer of the composition of claim 8 which has been heated to remove the volatile organic medium.

10. A dielectric ceramic layer comprising the dielectric sheet of claim 9 which has been fired to volatilize the organic medium therefrom and to densify the inorganic components by sintering.

11. A multilayer element comprising a plurality of the dielectric ceramic layers of claim 10 interspersed with electrically conductive layers.

12. A multilayer capacitor comprising a plurality of the dielectric sheets of claim 7 having a thick film electrode layer therebetween, the assemblage having been fired at a temperature below the melting point of the conductive metal in the electrode layer to volatilize organic medium and to sinter the inorganic materials without melting the conductive metal.

* * * * *